United States Patent [19]
Walters

[11] 3,763,746
[45] Oct. 9, 1973

[54] HYDRAULIC ACTUATOR CONTROLS
[75] Inventor: Ronald Bernard Walters, Wembley, England
[73] Assignee: Sperry Rand Limited, of London, England
[22] Filed: Sept. 13, 1971
[21] Appl. No.: 179,997

[30] Foreign Application Priority Data
Oct. 6, 1970 Great Britain.................. 47,349/70
July 23, 1971 Great Britain.................. 34,557/71

[52] U.S. Cl.................... 91/433, 91/459, 91/461
[51] Int. Cl.................. F15b 11/10, F15b 13/043
[58] Field of Search................... 91/433, 459, 275, 91/361, 461, 304; 137/106, 625.63

[56] References Cited
UNITED STATES PATENTS

| | | | |
|---|---|---|---|
| 2,944,530 | 7/1960 | Severinsen.................. | 91/275 X |
| 3,038,498 | 6/1962 | Seavey........................ | 91/433 X |
| 3,129,645 | 4/1964 | Olmsted...................... | 91/461 |
| 3,225,663 | 12/1965 | Pelisson..................... | 137/106 X |
| 3,260,273 | 7/1966 | Hayner....................... | 137/625.63 X |
| 3,555,969 | 1/1971 | Shah........................... | 137/625.62 X |
| 3,555,970 | 1/1971 | Borgeson et al.......... | 137/625.62 X |

FOREIGN PATENTS OR APPLICATIONS

| | | | |
|---|---|---|---|
| 691,449 | 5/1940 | Germany.................... | 91/433 |
| 1,426,471 | 11/1968 | Germany.................... | 91/461 |
| 609,808 | 10/1948 | Great Britain............. | 91/433 |
| 1,220,233 | 1/1971 | Great Britain............. | 91/275 |

*Primary Examiner*—Irwin C. Cohen
*Attorney*—Barnes, Kisselle, Raisch & Choate

[57] ABSTRACT

A device for controlling the pressure of fluid applied to or the flow of fluid to a hydraulic actuator comprises a pilot valve for controlling a pressure operated main valve. A transducer converts an electrical input signal into a force which is applied to the pilot valve spool. A feedback pressure is applied to piston means on or associated with the spool to apply a force thereto in opposition to the first-mentioned force. For pressure control a pressure sensing means produces a pressure difference equal to the pressure difference between the higher and lower operating pressures of the actuator. For flow control a flow sensor produces a feedback pressure differential dependent on the flow of fluid to the actuator.

Pressure and flow control can be optionally obtained by providing two pilot valves in series, one responsive to the pressure sensing means and the other responsive to the flow sensor. One of the pilot valves is set to override the feedback signal thereto, whereby the other pilot valve becomes effective as desired.

8 Claims, 8 Drawing Figures

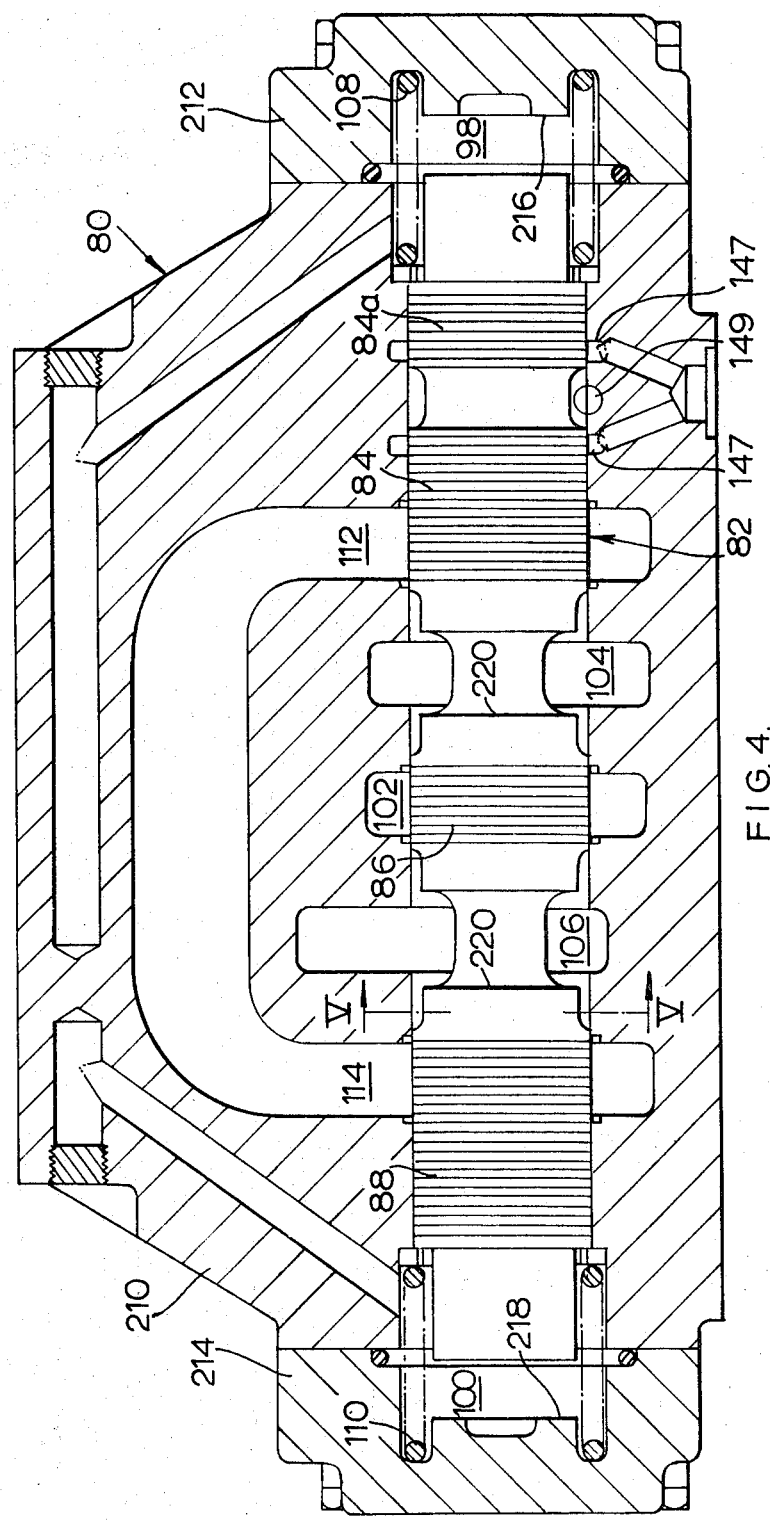

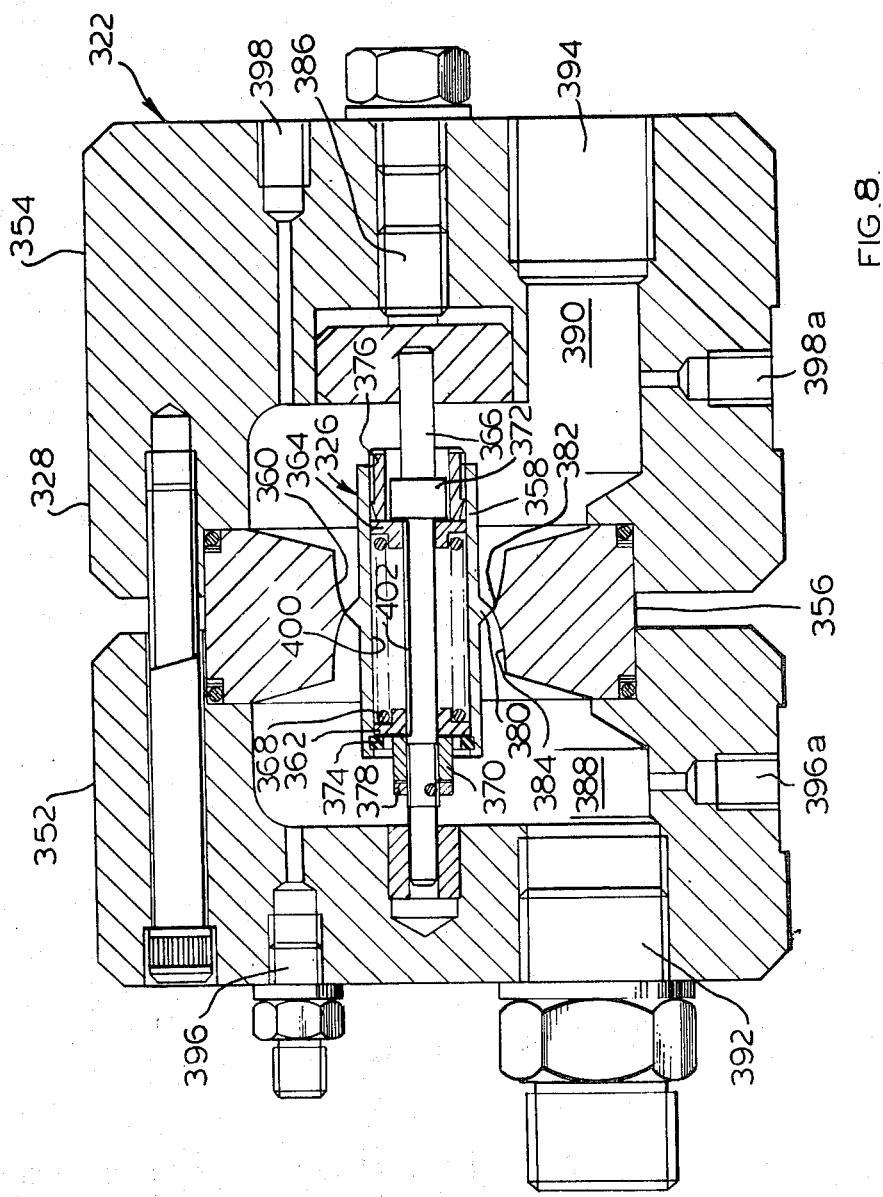

HYDRAULIC ACTUATOR CONTROLS

This invention relates to hydraulic actuator controls.

It is an object of the invention to provide directional and modulated control of load pressure drop across a hydraulic actuator by means of remote electrical signals.

It is another object of the present invention to provide directional and modulated flow control of a hydraulic actuator by means of remote electrical signals. It is desirable that the controlled output be unaffected by disturbances such as variations in load supply pressure or the temperature.

It is a further object of the present invention to combine flow control with a pressure limiting factor derived from a pressure actuated control system.

Co-pending patent application Ser. No. 104,020 filed Jan. 5, 1971, by Ronald B. Walters and Donald A. Larner and assigned to the assignee of the present application discloses a device for controlling the flow of fluid to a hydraulic actuator responsively to an electrical input signal comprising a fluid pressure operated main control valve for regulating the fluid flow to the actuator, a pilot valve for controlling the main control valve, said pilot valve including a spool for regulating the fluid pressure for operating the main control valve, a transducer for producing a first force dependent upon an electrical input signal and for applying said force to said spool, an opposed piston arrangement associated with said spool, flow sensing means for producing a pressure difference dependent upon the rate of fluid flow to the actuator, and feedback means for applying said pressure difference to said opposed piston arrangement to apply to said spool a second force opposed to said first force.

Another feature of the invention disclosed in the above mentioned co-pending patent application is a device for controlling the pressure of fluid applied to a hydraulic actuator responsively to an electrical input signal comprising a fluid pressure operated main control valve for regulating the fluid flow to the actuator, a pilot valve for controlling the main control valve, said pilot valve including a spool for regulating the fluid pressure for operating the main control valve, a transducer for producing a first force dependent upon an electrical input signal and for applying said force to said spool, a piston arrangement associated with said spool, pressure sensing means for producing a pressure dependent upon the fluid pressure operating on the actuator, and feedback means for applying said pressure to said piston arrangement to apply to said spool a second force opposed to said first force. A directional control valve can be connected in series with said pilot valve.

Thus, the two features of the invention of the above mentioned co-pending application may be combined in that the first and second pilot valves in accordance with the two features are arranged in series, such that the first pilot valve is operative for flow control when the second transducer is set to override the feedback from the pressure sensing means, at least below a predetermined maximum pressure, and the second pilot valve is operative for pressure control when the first transducer is set to override the feedback from the flow sensing means.

The pressure sensing means illustrated in the said co-pending application comprises a shuttle valve having a housing at whose opposite ends are inlet ports connected to said hydraulic actuator, at least during operation thereof, said actuator being double acting, said housing having a medial outlet port, and a valve member movable in said housing to close either one of said inlet ports and connect the unclosed one of said inlet ports to said outlet port, said feedback means being connected to said outlet port, whereby the outlet port receives the higher of the operating pressures in said double acting actuator, and the piston arrangement comprises smaller and larger piston areas effective in opposite directions, the feedback pressure being applied to the larger piston area, and means for applying a reference pressure to the smaller piston area.

In accordance with one aspect of the present invention, the pressure sensing means produces a pressure difference equal to the load pressure drop across the actuator, and this pressure difference is applied to the piston arrangement to apply to said spool a second force opposed to the first force.

A device in accordance with the present invention for controlling the pressure of fluid applied to a hydraulic actuator responsively to an electrical input signal comprises a fluid pressure operated main control valve for regulating the fluid flow to the actuator, a pilot valve for controlling the main control valve said pilot valve including a spool for regulating the fluid pressure for operating the main control valve, a transducer for producing a first force dependent upon an electrical input signal and for applying said force to said spool, a piston arrangement associated with said spool, pressure sensing means for producing a pressure dependent upon the fluid pressure operating on the actuator, and feedback means for applying said pressure to said piston arrangement to apply to said spool a second force opposed to said first force, the pressure sensing means comprising a shuttle valve having a housing at whose opposite ends are inlet ports connected to said hydraulic actuator, at least during operation thereof, said actuator being double acting, said housing having two outlet ports, and a valve member movable in said housing responsively to the pressures at said inlet ports to connect said inlet ports alternately to said outlet ports such that one of said outlet ports is always subjected to the higher of the operating pressures in said double acting actuator and the other is always subjected to the lower of the operating pressures, and the piston arrangement comprising equal piston areas effective in opposite directions, the pressures from said outlet ports being applied respectively to the two piston areas.

According to another aspect of the invention, a flow sensor comprises a spool movable between two chambers against the force of a spring and having a peripheral bead with a sharp rim which cooperates with the internal wall of an opening in an orifice plate, the spring being disposed between movable abutments which cooperate with fixed stops and with which stops inside the spool cooperate, the wall of the opening being so shaped that the pressure difference between said chambers is proportional to the quantity of fluid flowing from one chamber to the other through the annular orifice defined between the rim of the peripheral bead and said wall of said opening.

According to a further aspect of the present invention, the or each pilot valve has a non-linear flow displacement characteristic in order to maintain over the operating range a flow gain which is compatible with system stability, and so as not to appreciably affect the operation of the primary control mode when the secondary control mode performs a limiting function. The non-linear characteristic can be obtained by a suitable configuration of the ports with which the edges of the lands on the pilot valve spool cooperate.

According to still another aspect of the present invention, the main control valve has a valve spool whose lands are provided with slots cooperating with annular ports in the wall of the bore in which the spool is slidable.

According to yet another aspect of the present invention, the main control valve is spring biased to its neutral position, the flow control pilot valve is arranged between the pressure control pilot valve and the main control valve, the pressure control pilot valve is a 3-way valve and the inlet ports to the flow control pilot valve are connected respectively to drain and to the pressure control pilot valve. This leads to a simple construction of pilot valve and reduces the pressure drop across the pressure control pilot valve.

The invention is further described, by way of example, with reference to the accompanying drawings, in which:

FIG. 4 is a longitudinal section of the main stage of the multiple control valve;

FIG. 8 is a cross section of a preferred form of flow sensor.

Figure 1:
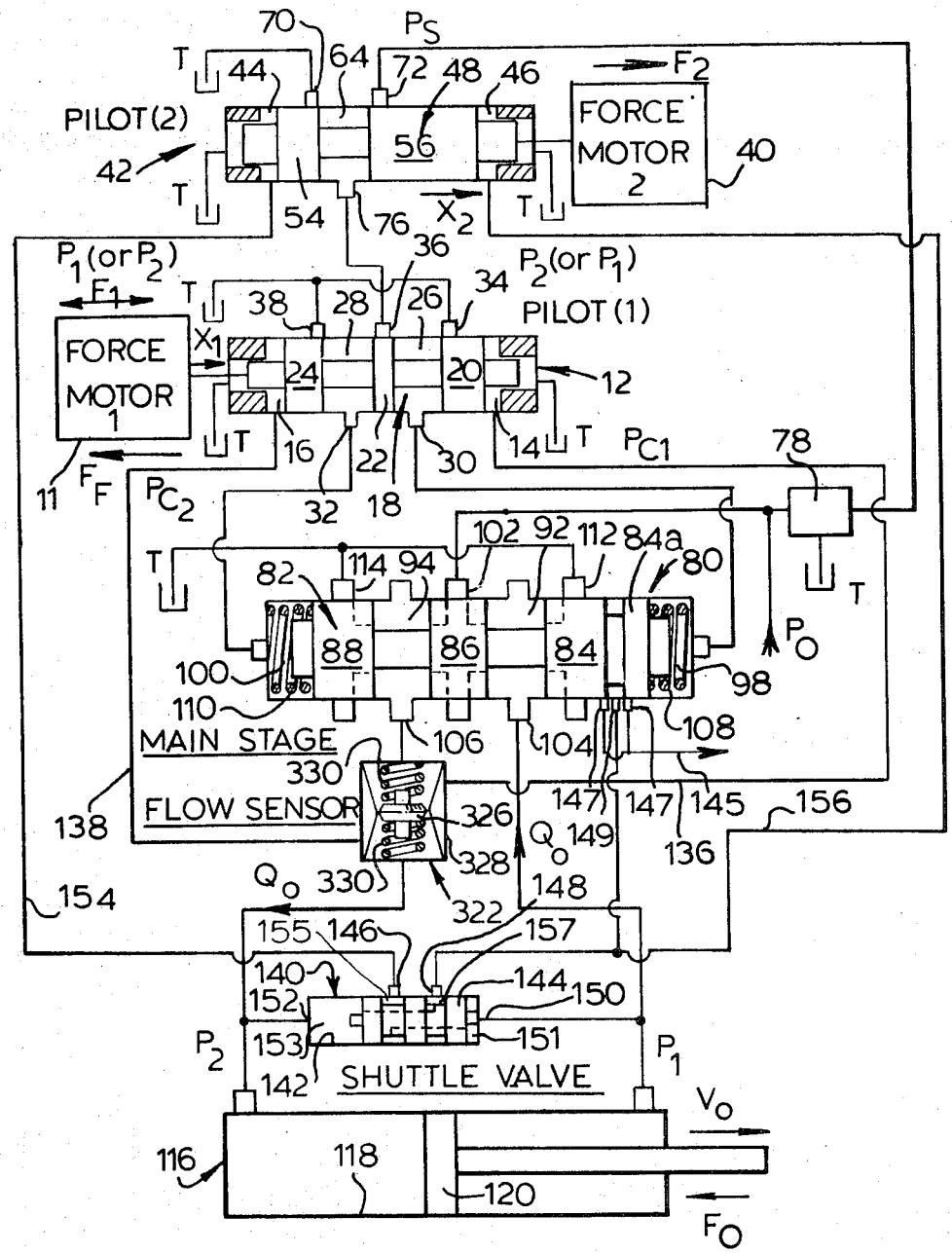
FIG. 1 is a circuit diagram of a multiple control valve constructed in accordance with the invention.

In FIG. 1 there is shown the circuit diagram of a multiple control valve by which the flow and pressure of hydraulic fluid supplied to an actuator may be controlled. The multiple control valve is conveniently of modular construction and comprises the following sub-units:

1. A flow control pilot valve (pilot 1);
2. A pressure control pilot valve (pilot 2);
3. A main control valve (main stage);
4. A flow sensor; and
5. A pressure sensitive shuttle valve.

The shuttle valve is in the housing of the main stage. In an alternative arrangement both the flow sensor and the shuttle valve can be incorporated in the housing of the main stage or in a so-called sandwich plate which is interposed between the main stage and either an adapter block or a manifold.

Referring to FIG. 1 in detail, pilot 1 comprises a linear force motor 11 which produces a force of appropriate polarity proportional to an electrical input current and a 4-way throttle valve 12 having feed back chambers 14, 16 of equal area at opposite ends of the spool 18. The spool carries three lands 20, 22, 24 which define between them two chambers 26, 28. Fluid ports 30, 32 are provided from the chambers 26, 28 for supplying fluid to and/or receiving fluid from a subsequent stage. Three further fluid ports 34, 36, 38 are provided which are closed by the three lands 20, 22, 24 respectively when the spool 18 is in its central position (that shown in FIG. 1).

Pilot 2 comprises a second linear force motor 40 which produces a force proportional to an input electrical current and a 3-way throttle valve 42 having differential feed back chambers 44, 46 at opposite ends of the spool 48. The spool carries two lands 54, 56 which between them define a chamber 64. The effective areas on the ends of the lands 54 and 56 on which fluid pressures in the chambers 44, 46 act are equal but fluid pressures in the two feed back chambers act in opposite directions.

Fluid ports 70, 72 are blocked by lands 54, 56 when the spool 48 occupies its illustrated central position. A further fluid port 76 communicates with the chamber 64.

Fluid ports 34 and 38 of pilot 1 are both connected to tank and fluid port 36 is connected to fluid port 76.

Fluid under pressure $P_s$ is supplied from a pressure source such as a pump (not shown) via a pressure regulating valve 78 to port 72 of pilot 2, and port 70 of pilot 2 is connected to tank, i.e., a reservoir of hydraulic fluid from which the pump draws its supply.

The main stage comprises a pilot operated 4-way throttle valve 80 containing a spool 82 having three notched lands 84, 86, 88 therein. The three lands define two chambers 92, 94 therebetween and the outer ends of the lands 84 and 88 are subjected to the fluid under pressure in pilot flow control chambers of equal area 98, 100 at opposite ends respectively of the valve 80. The pilot flow control chambers 98, 100 are supplied with hydraulic fluid under pressure from ports 30, 32 respectively of pilot 1.

The valve 80 includes a port 102 which is supplied with fluid under pressure at $P_o$. This may be, for example, supplied from the same pump (not shown) which supplies port 72. Further ports 112, 114 are connected to tank. The ports 112, 102 and 114 are covered by the lands 84, 86, 88, respectively, when the spool 82 occupies a central position normally adopted by the spool at zero input signal by virtue of springs 108, 110 respectively at opposite ends of the spool. Main flow ports 104, 106 communicate with the chambers 92, 94 respectively.

Hydraulic fluid from the main stage is supplied to a double acting actuator 116, comprising a cylinder 118 and a piston 120, through a flow sensor device generally designated 322. The flow sensor comprises a baffle 326 located by springs 330 and displaceable in a housing 328 against one or other of the springs 330 by the fluid flowing to or from the actuator 116. The interior of the housing 328 is so shaped that the pressure drop across the baffle 326 is proportional to the rate of flow of fluid through the sensor. The pressures at the opposite sides of the baffle 326 are applied by lines 136, 138 to the feed back pressure chambers 14 and 16 of pilot 1.

A pressure sensitive shuttle valve 140 comprises a cylinder 142 having two outlet ports 146, 148 and a valve piston 144 freely movable in the cylinder to connect each of two inlet ports 150, 152 at opposite ends of the cylinder 142 to the outlet ports 146, 148 or vice versa. The valve piston 144 defines chambers 151 and 153 at opposite ends of the cylinder 142 and communicating respectively with the inlet ports 150 and 152. The valve piston has two annular grooves 155, 157 defined between three lands. The grooves 155 and 157 are connected respectively to the chambers 151 and 153 by passages within the piston 144. In the illustrated position which the piston 144 adopts when the pressure in the chamber 153 is higher than the pressure in the chamber 151 the grooves 155 and 157 communicate respectively with the outlet ports 146 and 148. When the pressure in the chamber 151 is greater than that in the chamber 153, the piston 144 is moved to the left to place the groove 157 in communication with the outlet port 146 and connect the outlet port 148 directly to the chamber 151. The inlet port 150 is in communication with the pressure $P_1$ obtaining at one side of the piston 120 of the actuator 116 and the inlet port 152 is in communication with the pressure $P_2$ obtaining at the other side of the piston 120 in the actuator 116. The outlet port 148 thus always receives the higher of the two pressures $P_1$ and $P_2$. The outlet ports 146, 148 in the cylinder 142 are connected by fluid connections 154, 156 to the two feed back chambers 44, 46 in pilot 2.

FIG. 1 illustrates the multiple control valve in its neutral state. To enable the multiple control valve to operate in a so-called flow control mode the force motor 2 is fully energised to move the spool 48 fully to the right whereby the supply pressure $P_s$ is applied via the ports 72 and 76 to the port 36 of pilot 1 of which the ports 34 and 38 are connected directly to tank. To explain the sequence of operation it is assumed that the actuator is initially at rest and is required to move at a velocity $V_o$ in the direction indicated in FIG. 1. To initiate the sequence a reference current proportional to the required velocity $V_o$ and a polarity corresponding to the required direction is caused to flow in force motor 1. The resulting out of balance force $F_1$ will cause the spool 18 of pilot 1 to move through a distance $X_1$, say to the right, and this in turn will allow flow of oil from port 36 through chamber 28 and port 32 to the pilot chamber 100 of the main stage. Displaced fluid from the opposite pilot chamber 98 will return via port 30, chamber 26 and port 34 of pilot 1 to tank.

The throttling action of the main valve 80 controls the main flow $Q_o$ to and from the actuator 116. The fluid from the actuator has to pass through the flow sensor 322 which generates a differential pressure proportional to the controlled flow. Thus, a pressure $P_{c1}$ is generated in the fluid line 136 and a pressure $P_{c2}$ is generated in the fluid line 138. The pressures $P_{c1}$ and $P_{c2}$ are applied to the respective feed back chambers 14, 16 of pilot 1. The difference between $P_{c1}$ and $P_{c2}$ (i.e., $P_F = P_{c1} - P_{c2}$) acts across the pilot valve 1 and sets up a restoring force $F_F$ on the spool 18 tending to null the throttling effect of the valve thereby blocking the flow of oil to the main control valve. In the equilibrium condition, output flow $Q_o$ will be directly proportional to the current applied to the force motor 1.

It will be appreciated that the valve 12 will function solely as a flow control valve without pilot 2 by providing a fluid connection between the output from the pressure regulating valve 78 and the port 36. Thus, if a flow control valve only is required, pilot 2 and also the shuttle valve 140 may be dispensed with.

In the pressure control mode of operation of the multiple control valve, the normal direction of flow of fluid to and from the actuator and therefore the normal direction of movement of the actuator is determined by the setting of pilot 1. If current of appropriate polarity is applied to force motor 1 so that spool 18 moves completely to the left, the actuator will move in one direction and if current of appropriate polarity is applied to the force motor 1 so that the spool 18 is caused to move completely to the right then the actuator will move in the opposite direction.

The actuator piston 120 is initially considered to be moving at a velocity $V_o$ in the direction shown against an opposing load. It is required to increase the opposing load to a new value $F_o$. The sequence is initiated by supplying a reference current proportional to the required load pressure drop to the force motor 2, the direction of movement of the actuator being determined (as described above) by the polarity of the current applied to the force motor 1. Thus, while the system is in the pressure control mode of operation, pilot 1 acts as a directional control valve only.

The out of balance force resulting from the increased electric current applied to force motor 2 will displace the spool 48 of pilot 2 through a distance $X_2$ and this in turn will allow flow of fluid into one and out of the other control chamber 98, 100 of the main valve 80, causing the main valve spool to be displaced. The throttling action of the main valve spool controls the main valve flow $Q_o$ to and from the actuator 116. The increased velocity $V_o$ acting through the load resistance characteristics will tend to increase the opposing load acting on the actuator which in turn will increase its load pressure drop.

$P_1$ is applied via shuttle valve 140 and fluid line 154 to feed back chamber 44 of pilot 2 at the end of the spool 48 opposite to that connected to the force motor 40. $P_2$ is applied via the shuttle valve 140 and the fluid line 156 to the feed back chamber 46 in pilot 2. As previously mentioned, the area of the annular face of the land 56 is equal to he area of the annular face of the land 54 in chamber 44. Thus, the restoring force acting on spool 48 and force motor 40 is directly proportional to the load pressure drop across the actuator. In an alternative arrangement, the feed back chambers 44, 46 can take the form of bias pistons having areas in the ratio 1 to 1.

When the restoring force balances the force exerted by the force motor 2, the spool 48 of pilot 2 will tend to null, thus blocking the flow of fluid to the main valve chamber 98 or 100. If the restoring force momentarily exceeds the input force from the force motor 40, pilot valve 2 will connect the main valve control chamber 98 to tank as well as the control chamber 100. The main valve spool 82 is then returned towards its neutral position by the centering springs 108, 110, whereby the main flow $Q_o$ is reduced. The resulting drop in resistance $F_o$ will in turn reduce the load pressure drop and the consequent reduction of the restoring force acting on the force motor 2 will re-establish the equilibrium conditions. Sufficient damping is provided to prevent oscillation.

The setting of pilot 1 determines the direction of movement of the actuator 116. The rate of change of movement of the actuator 116 depends upon the force $F_2$ of the force motor 2 in relation to the load $F_0$ on the actuator 116. Since the restoring force acting on the spool 48 of pilot 2 in the pressure control mode of operation is directly proportional to the pressure difference across the actuator piston 120, the operation of pilot 2 is unaffected by asymmetrical pressure drop characteristics of the main stage arising from lap tolerance build up.

The higher of the two pressures $P_1$ and $P_2$ can also be used for adjusting the supply pressure $P_o$ in relation to the load pressure drop $P_L$.

In the case wherein the pump is a variable volume pump this is achieved by acting on the stroke control mechanism. In the case wherein the pump is a fixed displacement pump this is achieved by acting on the pressure relief valve which controls the main supply pressure $P_o$. So that pressures locked in the actuator 116 will not influence the pump when the actuator is not operating, a pump control line 145 is connected to two auxiliary ports 147 which lie on opposite sides of a further port 149 of the main valve 280. The line 156 which receives the higher of the pressures $P_1$ and $P_2$ from the shuttle valve 140 is connected to the port 149. In the neutral position of the spool 82 its lands 84 and 84a isolate the ports 147 from the port 149. As soon as the spool 82 is displaced from its neutral position, a groove between the lands 84 and 84a connects the port 49 to one or other of the ports 147.

In an alternative embodiment, the lower of the pressures $P_1$ and $P_2$ from the shuttle valve 140, i.e., that in the line 154, is used to adjust the supply pressure $P_o$ in relation to the load pressure drop $P_L$ by acting on the stroke control mechanism in the case of a variable volume pump and acting on the pressure relief valve where a fixed displacement pump is used. In the case wherein several loads are being controlled by a corresponding number of multiple control valves, the lowest of the sensed lower pressures will determine the required supply pressure $P_o$.

A preferred embodiment of flow sensor 322 is described more fully hereinafter with reference to FIG. 8 of the drawings.

Figure 2:
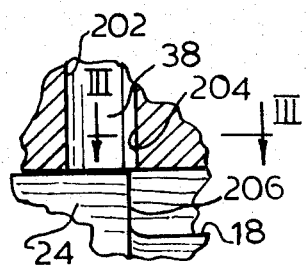
FIG. 2 is a fragmentary detail to a large scale of one of the ports of one of the pilot valves of the multiple control valve.
Figure 3:
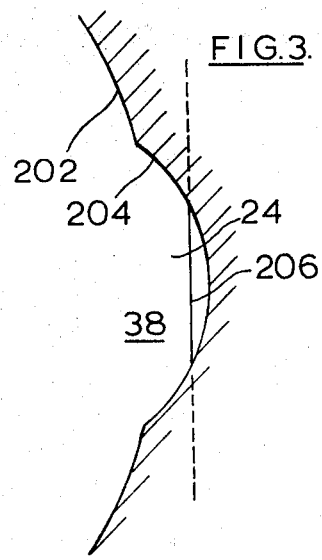
FIG. 3 is a fragmentary section on the line III—III of FIG. 2, but to an even larger scale.

FIGS. 2 and 3 of the drawings show the port construction of the pilot valves, e.g., the port 38 of pilot 1. The port 38 comprises two overlapping cylindrical bores 202 and 204 of which the bore 202 may, for example, have a diameter of 3/16 of an inch and the bore 204 may have a diameter of 1/16 of an inch with the centres of the two bores offset by 0.076 inch. In the neutral position of the spool 18 the edge 206 of the land 24 is spaced about six thousandths of an inch from a position in which the port 38 is completely closed. Thus, in the neutral position of the pilot there is a leakage flow from the inlet port 36 to the two tank ports 34 and 38. The port 34 has a construction identical to that of the port 38 but the port 36 is formed by two smaller bores on opposite sides of and overlapping a larger bore. The ports 70 and 72 of pilot 2 are identical to the port 38 of pilot 1.

The port configuration shown in FIGS. 2 and 3 of the drawings imparts a non-linear flow displacement characteristic to the pilot. It will be seen that this configuration reduces the flow gain of the pilot at smaller openings, thereby assisting in stabilising the system as a whole. Due to the larger flow gain at larger openings the pilot 2, when acting as a load pressure drop limiting valve in the flow control mode of the system, does not affect the operation of pilot 1 and likewise pilot 1 does not affect operation of pilot 2 in the pressure control mode.

Figure 6:
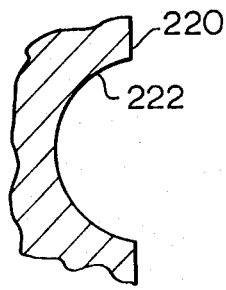
FIG. 6 is a section to a larger scale on the line VI—VI of FIG. 5.
Figure 5:
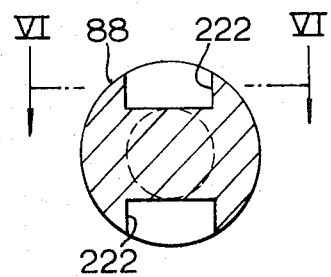
FIG. 5 is a section on the line V—V of FIG. 4.
Figure 7:
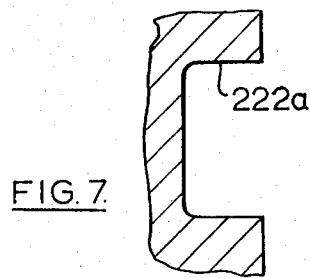
FIG. 7 is a section similar to FIG. 6 but showing a modification.

As can be seen in FIG. 4 of the drawings, the ports 102, 112 and 114 of the main stage 80 are annular. The drawing shows the lands 86, 84 and 88 respectively co-operating with these ports. The spool 82 is slidable in a housing 210 and the centering springs 108 and 110 are secured by end caps 212 and 214 which also define the control chambers 98 and 100. The end caps 212 and 214 have stops 216 and 218 which limit the travel of the spool 82 such that the main edges 220 of the lands cannot uncover their respective ports 102, 112 and 114. As can be seen in FIG. 5, each land, for example, the land 88, is provided with diametrically opposite slots 222 which are semi-circular as seen by the respective port 114. The travel of the spool 82 in relation to the flow through the valve is thereby increased so that the hydraulic gain in the main stage is reduced, thereby facilitating achievement of system stability. The semi-circular configuration shown in FIG. 6 gives the main stage a non-linear flow displacement characteristic. If a substantially linear flow displacement characteristic is required, then the opposed slots 222a should be given a square or rectangular configuration as shown in FIG. 7.

It will be seen from FIG. 1 that the control fluid returning through pilot 1 flows directly to tank and that only the incoming fluid at the pressure $P_s$ passes through pilot 2. This enables pilot 2 to be made a 3-way valve which simplifies construction and also reduces the pressure loss in pilot 2, thereby improving the transient response at load pressure levels approaching those of the pressure limiting value when operating in the flow control mode. The main stage relies on the centering springs 108, 110 for returning the spool 82 to its neutral position as pilot 2 cannot reverse the connections to the control chambers 98 an 100.

This also facilitates a fail-safe condition since at zero input signal to pilot 2, the main stage will return to neutral under the action of the centering springs.

FIG. 8 shows a preferred embodiment of flow sensor 322 in detail. Its housing 328 is conveniently in two parts 352 and 354 bolted together with an orifice plate 356 sandwiched therebetween. The movable baffle 326 comprises a spool 358 extending through the opening 360 in the orifice plate 356 and slidably mounted on spring abutment washers 362 and 364 which are themselves slidably mounted on a spindle 366. A spring 368 (replacing the two springs 330 of FIG. 1) acts between the washers 362 and 364 and urges them respectively against a preadjustable stop 370 and a fixed stop 372 on the spindle 366. A spring ring or circlip 374 in one end of the spool 358 cooperates with the washer 362. A bush 376 screwed into the other end of the spool 358 cooperates with the washer 364. With the stop 370 screwed out, the bush 376 is screwed in until the spring 368 lies without play between the spring ring 374 and the bush 376 but is uncompressed. The stop 370 is then screwed in until it just touches the washer 362 with the spring 368 still uncompressed and the washer 364 touching the stop 372, i.e., until the spacing between the stops 370 and 372 is equal to the spacing between the spring ring 374 and the bush 376. A lock nut 378 locks the preadjustable stop 370 in position.

The spool 358 includes a sharp rimmed peripheral bead 380 which cooperates with the wall of the opening 360 in the orifice plate 356. A set screw 386 in the housing part 354 is preadjusted to bring the rim of the bead 380 in registry with a crest 382 on the wall of the opening 360. The orifice plate 356 divides the interior of the housing 328 into two pressure chambers 388 and 390 which are provided with main ports 392 and 394 by which the flow sensor is connected in the main flow line for the hydraulic fluid. Additionally, each pressure chamber 388, 390 has several pressure ports 396, 396a, 398, 398a respectively. The lines 136, 138 (FIG. 1) are connected to the most conveniently accessible pair of pressure ports 396, 398 or 396a, 398a, the other pressure ports being blanked off.

The flow of fluid through the flow sensor in either direction between the ports 392 and 394 displaces the spool 358 in one direction or the other, from its illustrated central position against the force of the spring 368. The pressure difference between the chambers 388 and 390 acts on the spool cross section between the rim of the bead 380 and the cylindrical interior surface 400. To ensure that the interior of the spool 358 is always subjected to the higher of the pressures prevailing in the chambers 388 and 390 a groove 402 is provided in the spindle 366 between the stops 370 and 372. As long as each spring abutment washer 362, 364 rests against its respective stop 370 or 372 it closes off that end of the groove 402. As soon as one washer 362 or 364 is displaced from its respective stop the groove 402 is opened to provide a passage through the washer and connect the interior of the spool 358 to the outside of the washer 362 or 364 displaced by the spool. This also prevents fluid being locked inside the spool which would hinder movemvent of the washers 362 and 364.

The profile of the arcuate surfaces 384 of the wall of the opening 360 is so chosen in relation to the cross section of the spool 358 and the characteristics of the spring 368 and the fluid flowing through the sensor that the pressure difference between the chambers 388 and 390 is directly proportional to the quantity of fluid flowing.

In one preferred embodiment of the invention, the flow sensor described above is incorporated in the main valve body.

We claim:

1. A device for controlling the pressure of fluid applied to a double acting hydraulic actuator responsively to an electrical input signal comprising double-acting hydraulic actuator having opposed chambers, fluid pressure operated main control valve means for regulating the fluid flow to and from the actuator, pilot valve means for controlling the main control valve means, said pilot valve means including spool means for regulating the fluid pressure for operating the main control valve means, electrical input signal means, transducer means for producing a first force dependent upon said electrical input signal means and for applying said force to said spool means, piston means associated with said spool means and comprising substantially equal piston areas effective in opposite directions, and feedback means including shuttle valve means connected by conduit means to the opposed chambers of said actuator for applying to said opposed piston areas a pressure differential dependent upon the magnitude of the fluid pressure difference operating on the actuator to apply to said spool means a second net force opposed to said first force.

2. A device according to claim 1 in which said shuttle valve means comprises a housing at whose opposite ends are inlet ports connected to said hydraulic actuator, at least during operation thereof, said housing having two outlet ports, and a valve member including valve passages movable in said housing responsively to the pressures at said inlet ports to connect said inlet ports alternately to said outlet ports such that one of said outlet ports is always subjected to the higher of the operating pressures in the double acting actuator and the other of said outlet ports is always subjected to the lower of said operating pressures, said feedback means including means connecting said outlet ports respectively to said opposed piston areas.

3. A device for controlling the pressure of fluid applied to a double acting hydraulic actuator responsively to an electrical input signal comprising a double-acting hydraulic actuator having opposed chambers, fluid pressure operated main control valve means for regulating the fluid flow to the actuator, pilot valve means for controlling the main control valve means, said pilot valve means including spool means for regulating the fluid pressure for operating the main control valve means, a directional control valve between said pilot valve means and said main control valve means for determining the direction of operation of said actuator, electrical input signal means, transducer means for producing a first force dependent upon an electrical input signal means and for applying said force to said spool means, piston means associated with said spool means including valve means connected by conduit means to said opposed chambers of said actuator, and pressure responsive feedback means for applying in a given direction to said piston means a pressure dependent upon the magnitude of the fluid pressure operating on the actuator to apply to said spool means a second force opposed to said first force.

4. A device according to claim 3 in which said pilot valve means comprises a three port valve.

5. A device for controlling the pressure of fluid applied to a double acting hydraulic actuator responsively to an electrical input signal comprising a double-acting hydraulic actuator having opposed chambers, fluid pressure operated main control valve means for regulating the fluid flow to and from the actuator, pilot valve means for controlling the main control valve means, said pilot valve means including spool means for regulating the fluid pressure for operating the main control valve means, electrical input means, transducer means to producing a first force dependent upon said electrical input signal means and for applying said force to said spool means, piston means associated with said spool means and comprising substantially equal piston areas effective in opposite directions, directional control valve means connected in series with said pilot valve means, and pressure responsive feedback means including valve means connected by conduit means to said opposed chambers of said actuator for applying to said opposed piston areas a pressure differential dependent upon the mangitude of the fluid pressure difference operating on the actuator to apply to said spool means a second net force opposed to said first force.

6. A device according to claim 5 further comprising second electrical transducer means for operating said directional control valve means.

7. A device according to claim 5 in which said directional control valve means is connected between said pilot valve means and said main control valve means.

8. A device according to claim 7 in which said pilot valve means comprises a three port valve.

* * * * *